D. H. DOTTERER.
Railway-Car Axles.

No. 156,779.

Patented Nov. 10, 1874.

Witnesses
T. F. Hartman
M. A. M. Connolly

Inventor
David H. Dotterer
By Connolly Bros.
Attorneys

UNITED STATES PATENT OFFICE.

DAVIS H. DOTTERER, OF PHILADELPHIA, PENNSYLVANIA.

IMPROVEMENT IN RAILWAY-CAR AXLES.

Specification forming part of Letters Patent No. 156,779, dated November 10, 1874; application filed September 23, 1874.

*To all whom it may concern:*

Be it known that I, DAVIS H. DOTTERER, of Philadelphia, in the county of Philadelphia and State of Pennsylvania, have invented certain new and useful Improvements in Car-Axles; and I do hereby declare the following to be a full, clear, and exact description of the invention, such as will enable others skilled in the art to which it pertains to make and use it, reference being had to the accompanying drawings, which form part of this specification, in which—

Figure 1:
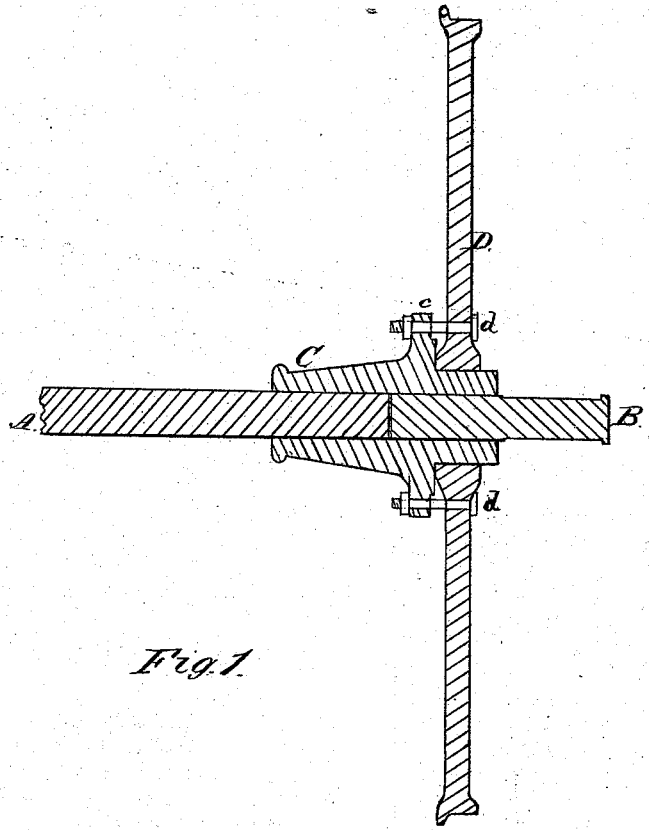
Figure 3:
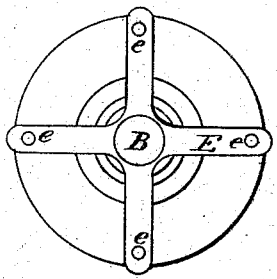
Figure 2:
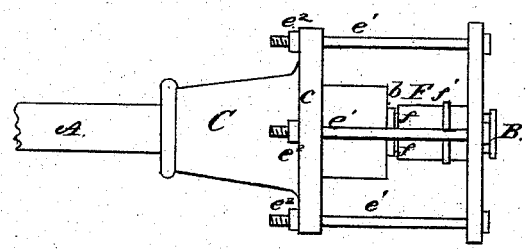

Figure 1 is a longitudinal section. Fig. 2 is a side elevation. Fig. 3 is a front view, partly in section.

My invention has relation to railroad-car axles; and consists, essentially, in the combination, with a car-wheel, of a wrought-iron axle and steel journals, each made independent and solid, and connected by being drawn end to end within the wheel, and secured rigidly without the aid of axle-keys, corresponding arms and sockets, or equivalent devices usually employed in connection with sectional axles to couple the parts.

Referring to the accompanying drawings, A represents an iron axle; B, a steel journal, and C a cast-metal hub, into which said axle and journal are, respectively, drawn until their adjacent ends meet. D represents a car-wheel drawn on the hub C and secured in place by bolts $d\ d$ passing through the annular flange $c$.

To enable others to clearly understand and use my improvement, I will describe my method of drawing the axle and journal into the hub.

The wheel D, it may be remarked, is drawn on the hub by means of bolts $d\ d$. To draw the journal B into the hub C I employ the devices shown in Figs. 2 and 3, in which E represents a disk or equivalent gland, having openings $e\ e$ for the passage of long bolts, whose threaded ends pass through the corresponding openings in the flange $c$. F is a segmental sleeve, formed by two half-boxes, $f\ f$, held together by an encircling band, $f'$. This sleeve is placed in position on the journal B, impinging upon the shoulder $b$ of the latter. The disk E being now placed outside of the sleeve F and the long bolts $e^1\ e^1$ inserted, as shown, upon turning the nuts $e^2\ e^2$ or bolts the journal will be drawn into the socket of the hub C until it meets the end of the axle A.

To draw the journal out of the hub the parts are arranged as follows: The gland E between the sleeve F and the hub C, the ends of the bolt pressing against the face of the wheel, or against the face of the flange $c$, and the nuts on said bolts resting against the inner side of the gland E. On turning the nuts or bolts as above described, the journal will be drawn out of the hub.

I am aware that, broadly considered, an iron axle and steel journal applied to a car-wheel hub is not new. My invention, however, is distinguishable from those already in use belonging to the same class in having the axle and journal both made solid, and in being brought together within the hub at their adjacent ends only, thus dispensing with keys, socket-connections, and other equivalent contrivances, which not only increase the cost of manufacture, but tend to render the parts less serviceable.

Having fully described my invention, I claim as new and desire to secure by Letters Patent—

The combination of the wrought-iron axle A, steel journal B, and wheel-hub C, the said axle and journal being solid and placed end to end within the hub, substantially as shown and set forth.

In testimony that I claim the foregoing I have hereunto set my hand this 18th day of September, 1874.

DAVIS H. DOTTERER.

Witnesses:
M. DANL. CONNOLLY,
L. FRANK HARTMAN.